United States Patent
Yamamori

(10) Patent No.: US 9,856,009 B2
(45) Date of Patent: Jan. 2, 2018

(54) MANUFACTURING METHOD OF REINFORCING STRUCTURE

(71) Applicant: MITSUBISHI HEAVY INDUSTRIES, LTD., Tokyo (JP)

(72) Inventor: Taku Yamamori, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 14/901,830

(22) PCT Filed: Jun. 26, 2014

(86) PCT No.: PCT/JP2014/067014
§ 371 (c)(1),
(2) Date: Dec. 29, 2015

(87) PCT Pub. No.: WO2015/005126
PCT Pub. Date: Jan. 15, 2015

(65) Prior Publication Data
US 2016/0368584 A1 Dec. 22, 2016

(30) Foreign Application Priority Data
Jul. 12, 2013 (JP) ................ 2013-146810

(51) Int. Cl.
*B64C 1/12* (2006.01)
*B64D 45/02* (2006.01)
(Continued)

(52) U.S. Cl.
CPC .............. *B64C 1/12* (2013.01); *B29C 31/008* (2013.01); *B29C 70/86* (2013.01); *B29C 70/882* (2013.01);
(Continued)

(58) Field of Classification Search
CPC ......... B29C 70/882; B64C 1/064; B64C 1/12; B64D 45/02; B64D 37/32; B64F 5/10
See application file for complete search history.

(56) References Cited

U.S. PATENT DOCUMENTS

| 7,740,434 B2 | 6/2010 | Kamino et al. |
| 8,821,666 B2 | 9/2014 | Bechtold et al. |

(Continued)

FOREIGN PATENT DOCUMENTS

| DE | 102007015517 A1 | 10/2008 |
| EP | 1772376 A2 | 4/2007 |

(Continued)

OTHER PUBLICATIONS

PCT/IB/338, "Notification of Transmittal of Translation of the International Preliminary Report on Patentability for International Application No. PCT/JP2014/067014," dated Jan. 21, 2016.

(Continued)

*Primary Examiner* — John Goff
(74) *Attorney, Agent, or Firm* — Manabu Kanesaka; Benjamin Hauptman; Kenneth Berner

(57) ABSTRACT

A manufacturing method of a reinforcing structure includes: preparing a stringer having a fiber exposure surface; arranging an insulation protection material to cover at least a part of the fiber exposure surface; arranging the stringer on a skin having an uncured resin component; and curing the skin after the arranging the stringer. The insulation protection material includes a composite material having a resin component and an insulative fiber component. The curing the skin includes curing the skin and the insulation protection material at the same time. In the manufacturing method of a reinforcing structure, an edge glow discharge can be prevented without increasing a manufacturing process.

7 Claims, 5 Drawing Sheets

(51) Int. Cl.
   *B29C 70/86* (2006.01)
   *B29C 31/00* (2006.01)
   *B29D 99/00* (2010.01)
   *B64C 1/06* (2006.01)
   *B64C 3/18* (2006.01)
   *B29C 70/88* (2006.01)
   *B29L 31/30* (2006.01)
   *B29C 35/00* (2006.01)
   *B64C 1/00* (2006.01)
   *B29K 105/08* (2006.01)
   *B29K 307/04* (2006.01)

(52) U.S. Cl.
   CPC .......... *B29D 99/0014* (2013.01); *B64C 1/064* (2013.01); *B64C 3/182* (2013.01); *B64D 45/02* (2013.01); *B29C 2035/005* (2013.01); *B29K 2105/08* (2013.01); *B29K 2307/04* (2013.01); *B29K 2995/0005* (2013.01); *B29L 2031/3085* (2013.01); *B64C 2001/0072* (2013.01); *Y02T 50/433* (2013.01)

(56) References Cited

U.S. PATENT DOCUMENTS

| | | |
|---|---|---|
| 8,911,580 B2 | 12/2014 | Law et al. |
| 2008/0128430 A1 | 6/2008 | Kovach et al. |
| 2010/0124659 A1* | 5/2010 | Nelson ............... B29C 35/0266 428/411.1 |
| 2010/0139847 A1 | 6/2010 | Law et al. |
| 2010/0147460 A1* | 6/2010 | Lefebure ............... B29C 65/02 156/307.1 |
| 2011/0278395 A1 | 11/2011 | Telgkamp et al. |
| 2012/0043019 A1* | 2/2012 | Belpaire ............ B29C 44/1228 156/293 |
| 2012/0100343 A1* | 4/2012 | Borghini-Lilli ......... B29C 70/30 428/156 |
| 2013/0168009 A1 | 7/2013 | Cebolla Garrofe et al. |
| 2013/0236692 A1 | 9/2013 | Tanaka et al. |
| 2013/0277372 A1 | 10/2013 | Waku |
| 2015/0165742 A1* | 6/2015 | Reese, Jr. ............... B32B 7/045 156/64 |
| 2016/0368583 A1 | 12/2016 | Yamamori |
| 2016/0368584 A1 | 12/2016 | Yamamori |

FOREIGN PATENT DOCUMENTS

| | | |
|---|---|---|
| EP | 2610047 A1 | 7/2013 |
| EP | 3020539 A1 | 5/2016 |
| EP | 3020540 A1 | 5/2016 |
| JP | 2010-523357 A | 7/2010 |
| JP | 2012-162147 A | 8/2012 |
| JP | 2012-187808 A | 10/2012 |
| WO | 2008/019894 A1 | 2/2008 |
| WO | 2008/119701 A1 | 10/2008 |
| WO | 2015/005125 A1 | 1/2015 |
| WO | 2015/005126 A1 | 1/2015 |

OTHER PUBLICATIONS

PCT/IB/373, "International Preliminary Report on Patentability for International Application No. PCT/JP2014/067014" dated Jan. 12, 2016.
PCT/ISA/237, "Written Opinion of the International Searching Authority for International Application No. PCT/JP2014/067014," dated Sep. 9, 2014.
PCT/IB/326, "Notification Concerning Transmittal of International Preliminary Report on Patentability for International Application No. PCT/JP2014/067014," dated Jan. 21, 2016.
PCT/IB/338, "Notification of Transmittal of Translation of the International Preliminary Report on Patentability or International Application No. PCT/JP2014/067008," dated Jan. 21, 2016.
PCT/IB/373, "International Preliminary Report on Patentability for International Application No. PCT/JP2014/067008" dated Jan. 12, 2016.
PCT/ISA/237, "Written Opinion of the International Searching Authority for International Application No. PCT/JP2014/067008," dated Sep. 2, 2014.
PCT/IB/326, "Notification Concerning Transmittal of International Preliminary Report on Patentability for International Application No. PCT/JP2014/067008," dated Jan. 21, 2016.
PCT, "International Search Report for International Application No. PCT/JP2014/067008".
PCT, "International Search Report for International Application No. PCT/JP2014/067014".
USPTO, "Office Action for U.S. Appl. No. 14/901,822," dated Jan. 17, 2017.
Canada Patent Office, "Office Action for Canadian Patent Application No. 2917796," dated Nov. 22, 2016.
Canada Patent Office, "Office Action for Canadian Patent Application No. 2917127," dated Dec. 8, 2016.
Europe Patent Office, "Search Report for European Patent Application No. 14823339.8," dated Mar. 1, 2017
Europe Patent Office, "Search Report for European Patent Application No. 14822710.1," dated Mar. 8, 2017.
USPTO, "Final Office Action for U.S. Appl. No. 14/901,822," dated May 11, 2017.

\* cited by examiner

MANUFACTURING METHOD OF REINFORCING STRUCTURE

TECHNICAL FIELD

The present invention relates to a manufacturing method of a reinforcing structure.

BACKGROUND ART

A fiber reinforced composite material (e.g. carbon fiber reinforced plastic: CFRP) composed of a fiber component and a resin component is sometimes used for a skin of a main wing member of an aircraft and so on. A stringer (a longitudinal material) is sometimes attached to the skin to improve strength of the skin. The skin to which the stringer is attached is hereinafter referred to as a reinforcing structure. The fiber reinforced composite material is sometimes used for the stringer, like the skin.

Upon manufacturing the reinforcing structure, a cured stringer is arranged on an uncured skin through adhesive. Next, the skin is cured by use of heat and pressure and the stringer is bonded with the skin as a unitary body.

The cured stringer is sometimes processed to adjust its size before being bonded with the skin. When the processing is carried out, the fiber component is exposed in a processed surface. That is, a fiber exposure surface is formed in a part of the stringer.

A current or voltage is sometimes applied to the reinforcing structure in the operation. For example, when the reinforcing structure is used for the main wing member of the aircraft, a lighting current or a high voltage is sometimes applied to the reinforcing structure due to a thunder. When the fiber exposure surface exists, an edge glow discharge sometimes occurs with the applied current or voltage.

A technique of preventing the edge glow discharge is disclosed in Patent Literature 1 (US 2008/0128430A1). In Patent Literature 1, to seal up the fiber exposure surface with a thermosetting resin layer and to cure the sealed resin layer are disclosed.

CITATION LIST

[Patent Literature 1] US 2008/0128430A1

SUMMARY OF THE INVENTION

As described in the Patent Literature 1, when the fiber exposure surface is sealed by the thermosetting resin layer, it is required to newly add a process of curing the thermosetting resin layer. Therefore, the manufacturing process increases.

On the other hand, it could be considered that a seal material such as a gum material is applied to the fiber exposure surface, after the stringer is stuck to the skin and the skin is cured. However, even in this case, the manufacturing process increases because of the application of the seal material. Also, the number of parts increases.

Therefore, an object of the present invention is to provide a manufacturing method of a reinforcing structure which can prevent an edge glow discharge without increasing a manufacturing process.

A manufacturing method of a reinforcing structure according to an embodiment of the present invention includes: preparing a stringer having a fiber exposure surface; arranging an insulation protection material to cover at least a part of the fiber exposure surface; arranging the stringer on a skin having an uncured resin component; and curing the skin after the arranging the stringer. The insulation protection material includes a composite material having a resin component and an insulative fiber component. The curing the skin includes curing the skin and the insulation protection material at a same time.

According to the present invention, the manufacturing method of the reinforcing structure is provided which can prevent an edge glow discharge without increasing a manufacturing process.

DESCRIPTION OF THE EMBODIMENTS

Hereinafter, embodiments will be described with reference to the drawings.

First Embodiment

Figure 1:
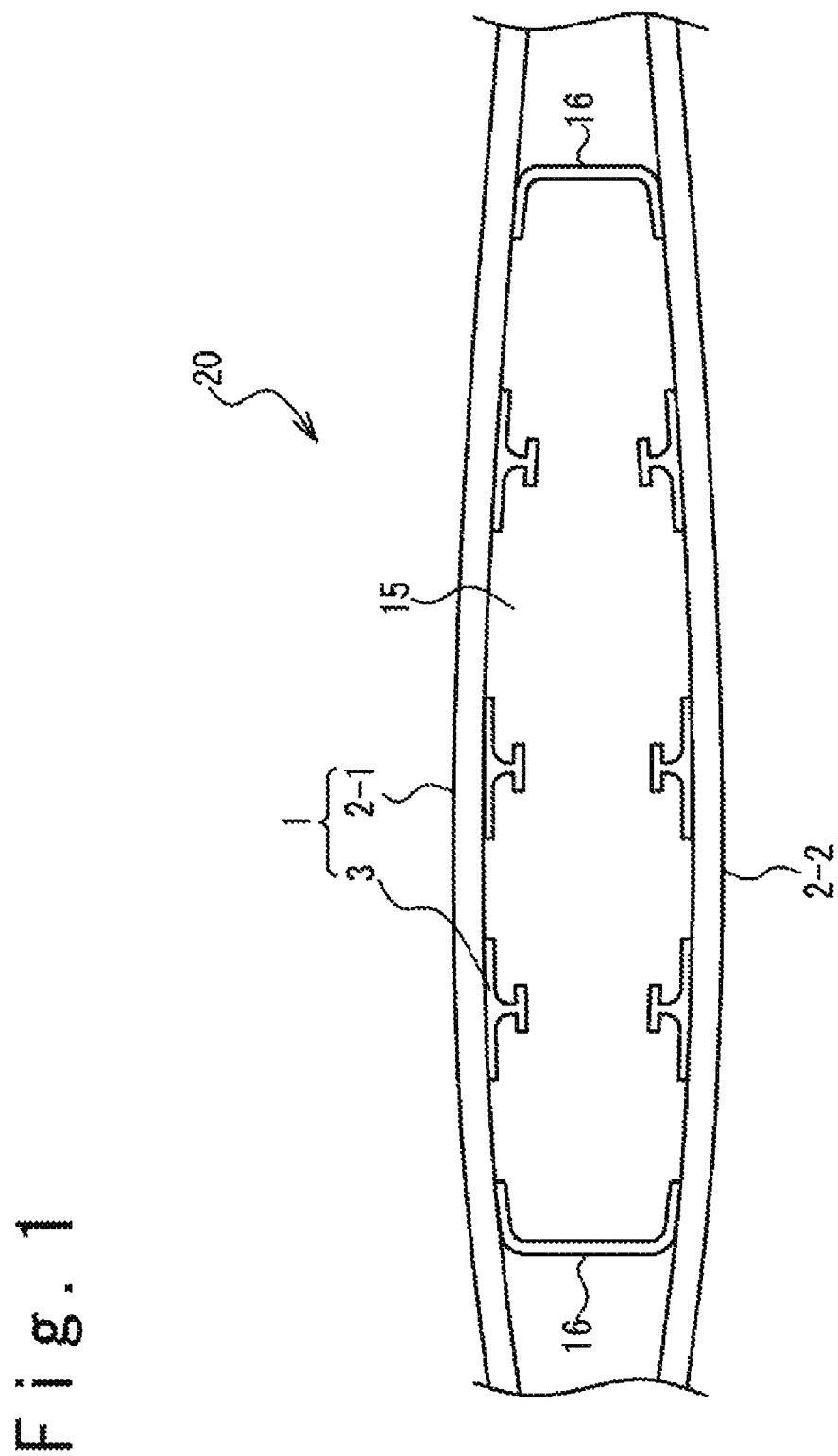
FIG. 1 is a cross-sectional view schematically showing a main wing member to which a reinforcing structure according to a first embodiment of the present invention is applied.

FIG. 1 is a cross-sectional view schematically showing a main wing member 20 to which a reinforcing structure 1 according to a first embodiment is applied. As shown in FIG. 1, the main wing member 20 has a couple of skins 2 (2-1, 2-2) and spars 16. The spar 16 is arranged between the skin 2-1 and the skin 2-2. A fuel tank 15 is formed from a region surrounded by the skin 2-1, the skin 2-2 and the spars 16. Also, stringers 3 are bonded with the skins 2 and, thus, the reinforcing structure 1 is structured. That is, the reinforcing structure 1 contains the skins 2 and the stringers 3.

For the skin 2 and the stringer 3, a fiber reinforced composite material composed of a fiber component and a thermosetting resin component is used. For example, a carbon fiber reinforced plastic material is used as this fiber reinforced composite material. When a fiber exposure surface exists in the stringer 3, there is a case that an edge glow discharge occurs as mentioned above. When the fiber exposure surface exists in the fuel tank 15, there is a possibility to ignite fuel due to the edge glow discharge. Therefore, the prevention of edge glow discharge is especially required to the stringer 3 which is arranged in the fuel tank 15.

Figure 2:
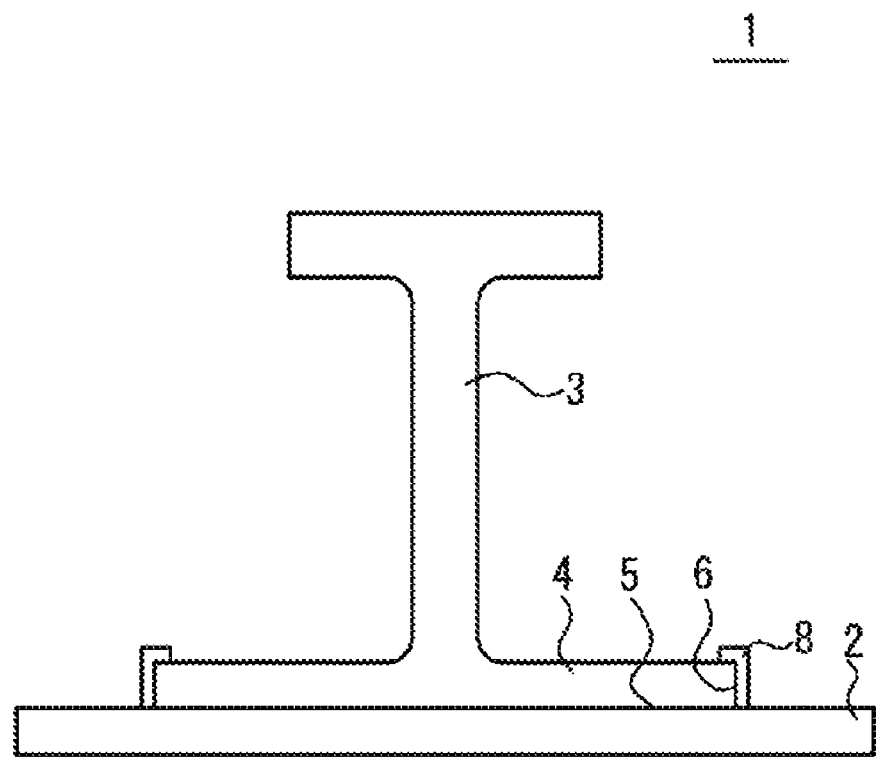
FIG. 2 is a cross-sectional view schematically showing an example of the reinforcing structure.

FIG. 2 is a cross-sectional view schematically showing the reinforcing structure 1. As described above, the reinforcing structure 1 has the skins 2 and the stringers 3.

The stringer 3 has a board section 4. The board section 4 has an adhesive surface 5 and end surfaces 6, and is bonded with the skin 2 on the adhesive surface 5. The end surface 6 is a portion processed after the stringer 3 is cured and has the fiber exposure surface.

An insulation protection layer is provided for the stringer 3 to cover the end surface 6. Because the insulation protection layer 8 is provided, the fuel is insulated from the fiber component exposed on the fiber exposure surface. Thus, the edge glow discharge is prevented.

Figure 3:
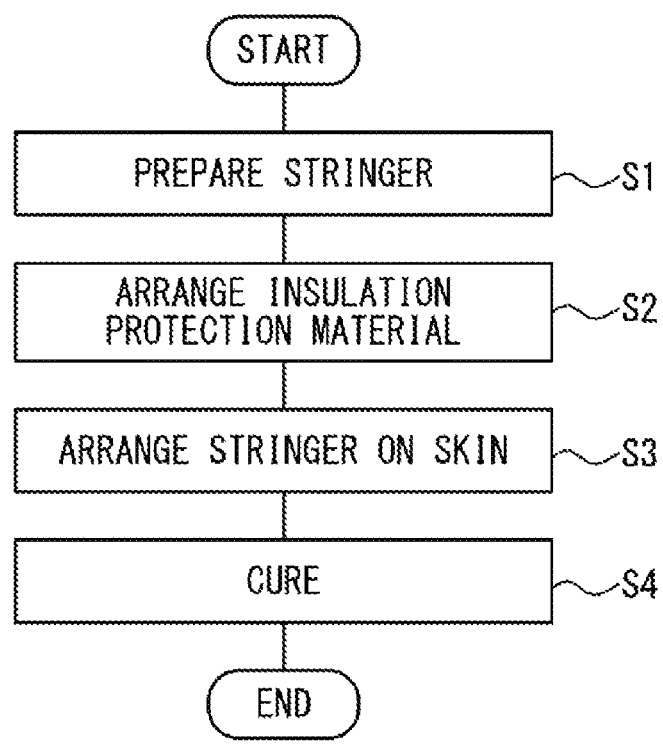
FIG. 3 is a flow chart showing an example of the manufacturing method of the reinforcing structure.

Next, the manufacturing method of the reinforcing structure 1 according to the present embodiment will be described. FIG. 3 is a flow chart showing the manufacturing method of the reinforcing structure 1.

Step S1: Preparation of Stringers

First, the cured stringers 3 are prepared. The stringer 3 contains the fiber component and the resin component as mentioned previously, and the fiber component is impregnated in the resin component. Thus, the surface of the stringer 3 is covered with the resin component. Next, to adjust the size and so on, the end surface 6 of the stringer 3 is polished. Thus, the end surface 6 becomes the fiber exposure surface.

Step S2: Arrangement of Insulation Protection Material

Figure 4:
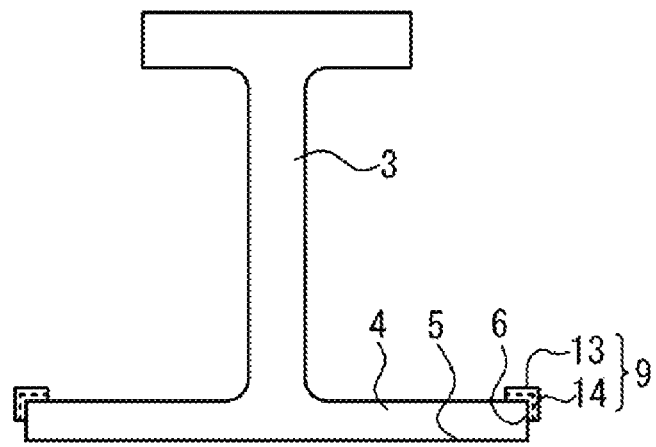
FIG. 4 is a cross-sectional view schematically showing an example of the manufacturing method of the reinforcing structure.

Next, as shown in FIG. 4, the insulation protection material 9 is applied to (arranged on) the stringer 3. The insulation protection material 9 is stuck to cover at least a part of the end surface 6.

As the insulation protection material 9, a composite material composed of an uncured thermosetting resin component 13 and an insulative fiber component 14 is desirably used. Specifically, in the present embodiment, a fiber glass component is used as the fiber component 14. As the insulation protection material 9, a glass fiber reinforced plastics material is desirably used.

Figure 5:
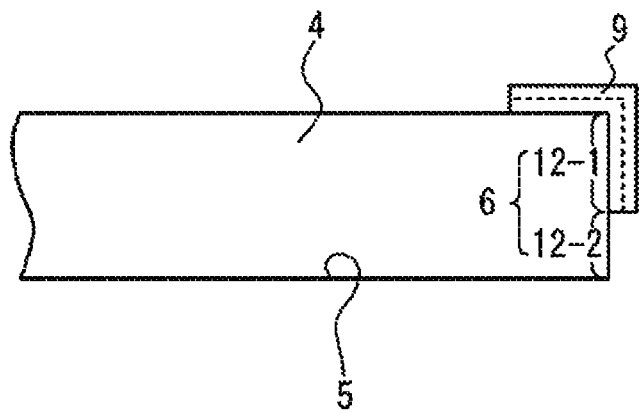
FIG. 5 is a cross-sectional view schematically showing an example of the manufacturing method of the reinforcing structure.

FIG. 5 is a cross-sectional view schematically showing the structure of the end surface 6. At this step, the insulation protection material 9 is stuck only on a part of the end surface 6 to be separated from the adhesive surface 5. In other words, the insulation protection material 9 is stuck such that a covered area 12-1 and an exposed area 12-2 are formed on the end surface 6. The covered area 12-1 is an area covered with the insulation protection material 9. On the other hand, the exposed area 12-2 is an area where the end surface 6 is exposed. The exposed area 12-2 is provided between the covered area 12-1 and the adhesive surface 5.

It should be noted that the exposed area 12-2 is set to be covered with a flowing out adhesive 10 (to be described later).

Step S3: Arrangement of Stringers

Figure 6:
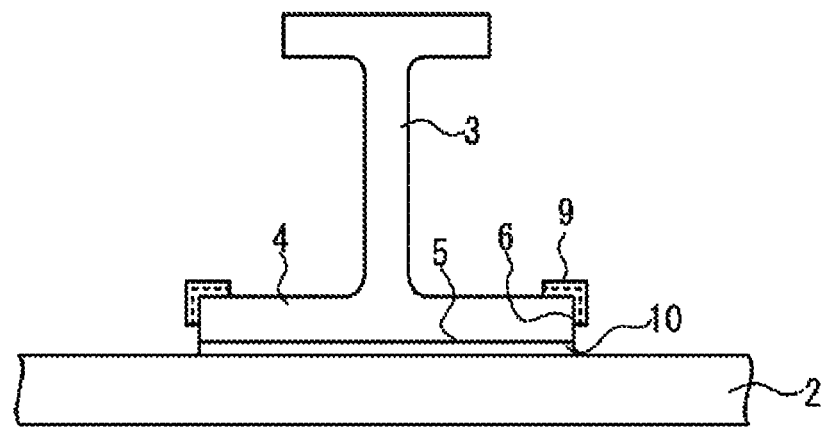
FIG. 6 is a cross-sectional view schematically showing an example of the manufacturing method of the reinforcing structure.

Next, as shown in FIG. 6, each of the stringers 3 is arranged on the uncured skin 2. Specifically, first, the adhesive 10 is applied to the adhesive surface 5. After that, the stringer 3 is arranged on the skin 2 so that the adhesive surface 5 is stuck to the skin 2.

It should be noted that as the adhesive 10, a thermosetting resin sheet is desirably used.

Step S4: Curing

Next, the skin 2 and the insulation protection material 9 are cured at the same time. That is, the resin components of both of the skin 2 and the insulation protection materials 9 are cured at the same time. For example, the skin 2 and the insulation protection material 9 are cured by use of heat and pressure. In this case, the adhesive 10 is also cured. Thus, the stringer 3 is combined with the skin 2 to form a unitary body, and the reinforcing structure 1 is obtained.

Figure 7:
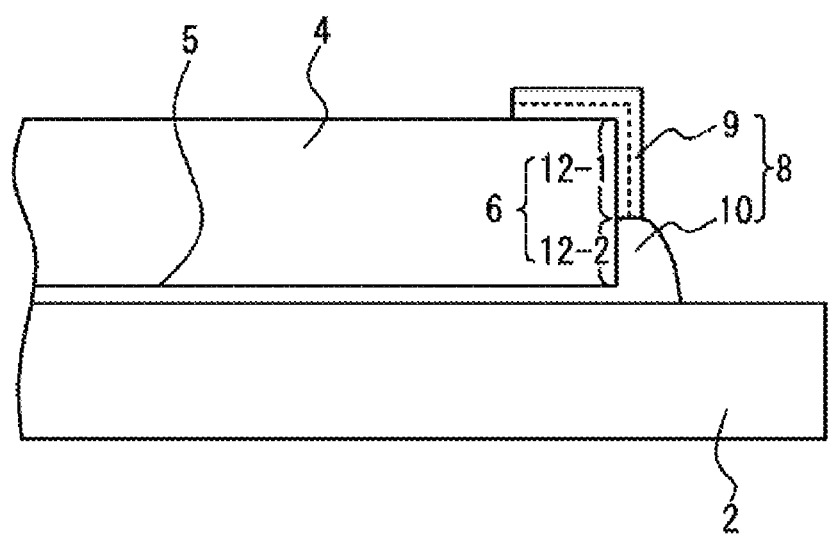
FIG. 7 is a cross-sectional view schematically showing an example of the manufacturing method of the reinforcing structure.

Here, in case of the curing, the adhesive 10 begins to flow out from portions corresponding to the ends of the board section 4. As shown in FIG. 7, the exposed area 12-2 on the end surface 6 is covered with the flowed-out adhesive 10. As a result, the end surface 6 is covered with the insulation protection material 9 and the adhesive 10 to form the insulation protection layer 8.

The reinforcing structure 1 according to the present embodiment is obtained by the method described above.

According to the present embodiment, the curing of the insulation protection material 9 and the curing of the skin 2 are carried out in an identical process. Therefore, it is possible to seal the fiber exposure surface (the end surface 6) without adding a new process of curing the insulation protection material 9. That is, the reinforcing structure which can prevent an edge glow discharge can be manufactured without increasing a manufacturing process.

Also, because it is possible to use the composite material such as a glass fiber reinforced plastics material for the insulation protection material 9, a special technique of sealing the fiber exposure surface is unnecessary. Also, the weight of the reinforcing structure 1 hardly increases.

In addition, according to the present embodiment, the insulation protection material 9 is stuck only on a part of the end surface 6 at Step S2 such that the insulation protection material 9 and the adhesive surface 5 are separated from each other. Thus, the edge glow discharge can be prevented while keeping the strength of the reinforcing structure. This point will be described below.

If the insulation protection material 9 is applied (stuck) to fully cover the end surface 6 as the fiber exposure surface, there is a possibility that the fiber component contained in the insulation protection material 9 enters between the skin 2 and the adhesive surface 5. The entered fiber component can become a cause that the stringer 3 separates from the skin 2. Also, if the fiber component such as the glass fiber with low strength enters between the stringer 3 and the skin 2, the strength of the reinforcing structure 1 reduces.

On the other hand, according to the present embodiment, the insulation protection material 9 is stuck only on a part of the end surface 6 to form the exposed area 12-2, as shown in FIG. 5. Therefore, the insulation protection material 9 does not enter or is not mixed between the adhesive surface 5 and the skin 2. Also, the exposed area 12-2 is covered with the adhesive 10 which flows out from the end. That is, the fiber exposure surface (the end surface 6) is covered with at least one of the insulation protection material 9 and the adhesive 10. As a result, the fiber exposure surface is fully covered with the insulation protection layer 8 and any edge glow discharge is prevented. The flow-out of the adhesive 10 becomes an impediment in a post-process generally, but in the present embodiment, the flow-out is used oppositely.

It should be noted that in the present embodiment, the reinforcing structure 1 which is applied to the fuel tank 15 of the main wing member 20 has been described. However, the reinforcing structure 1 is not always applied to the fuel tank 15. If the edge glow discharge must be prevented, the reinforcing structure 1 can be applied to other applications.

Also, in the present embodiment, the case where the glass fiber reinforced plastics material is used for the insulation protection material 9 has been described. However, the insulation protection material 9 is not limited to the glass fiber reinforced plastics material. The insulation protection material 9 may be a composite material composed of the resin component 13 and the insulative fiber component 14. For example, nylon fiber and so on may be used as the insulative fiber component 14.

Also, it is desirable that the resin component contained in the skin 2, the resin component contained in the stringer 3, the resin component 13 contained in the insulation protection material 9, and the adhesive 10 have an identical component. When these components are identical, the physical property of each section comes to resemble each other so that the strength of whole reinforcing structure 1 can be improved.

Also, as the resin component contained in skin 2, the resin component contained in the stringer 3, the resin component 13 contained in the insulation protection material 9, and, the adhesive 10, for example, an epoxy resin and an acrylic resin and so on can be used.

Also, after the insulation protection material 9 is applied to the stringer 3 (step S2) in the present embodiment, the stringer 3 is arranged on the skin 2. However, the insulation protection material 9 may be applied to the stringer 3 after the stringer 3 is arranged on the skin 2. Even in this case, the skin 2 and the insulation protection material 9 can be cured in the identical process.

Second Embodiment

Next, a second embodiment will be described. In the present embodiment, an application part of the adhesive 10 is devised, compared with the first embodiment. Because the same structure as in the first embodiment can be applied as for other points in the second embodiment, a detailed explanation is omitted.

In the present embodiment, before the application (step S2) of the insulation protection material 9, the adhesive 10 is applied to the stringer 3.

Figure 8:
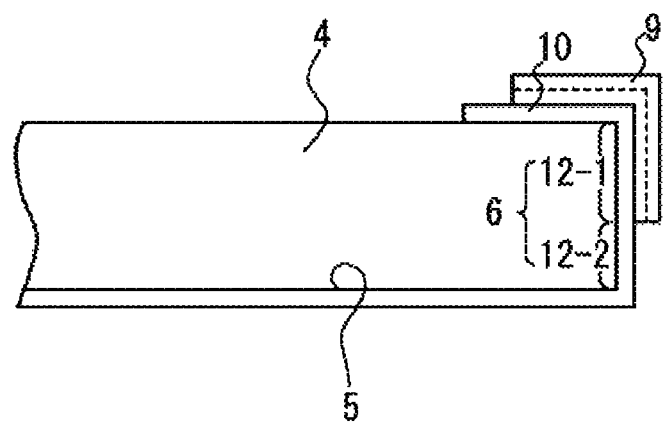
FIG. 8 is a cross-sectional view schematically showing an example of the manufacturing method of the reinforcing structure.

Specifically, the adhesive 10 is applied to cover the end surface 6, as shown in FIG. 8. That is, the adhesive surface 5 and the end surface 6 are fully covered with the adhesive 10. After that, the adhesive 10 is applied so that the insulation protection material 9 covers a part of the end surface 6. It should be noted that sheet-like adhesive 10 is desirably used.

According to the present embodiment, the end surface 6 as the fiber exposure surface is covered with the adhesive 10. Therefore, the exposed area 12-2 is surely covered with the adhesive 10. Thus, the edge glow discharge can be more surely prevented.

The present application claims a priority on convention based on Japan Patent Application (JP 2013-146810). The disclosure thereof is incorporated herein by reference.

The invention claimed is:

1. A manufacturing method of a reinforcing structure, comprising:
    preparing a cured stringer having a board section and formed of a composite material, wherein the board section has an adhesion surface to be adhered to a skin, and a fiber exposure surface as a side end surface extending along a longitudinal direction of the stringer, and the fiber exposure surface is formed to have a surface intersecting with the adhesion surface;
    arranging an uncured insulation protection material to cover a part of the fiber exposure surface on a separate side from the adhesion surface, wherein the insulation protection material comprises a composite material having a resin component and an insulative fiber component;
    applying an adhesive material on the adhesion surface of the board section of the stringer at least;
    adhering the stringer on the skin having an uncured resin component with the adhesive material; and
    curing the skin adhered with the cured stringer, and the insulation protection material at a same time such that the adhesive material flows out from an end portion of the board section, and the insulation protection material and the adhesive material flowing out from the end portion cover the fiber exposure surface.

2. The manufacturing method of the reinforcing structure, according to claim 1, wherein the curing comprises curing the skin adhered with the stringer, the insulation protection material, and the adhesive material at the same time.

3. The manufacturing method of the reinforcing structure, according to claim 1, wherein the arranging the uncured insulation protection material comprises:
    arranging the insulation protection material on the at least an upper part of the fiber exposure surface such that the insulation protection material is separated from the adhesion surface, and
    wherein the applying comprises applying the adhesive material on the adhesion surface of the a board section of the stringer with the insulation protection material arranged.

4. The manufacturing method of the reinforcing structure according to claim 1, wherein the fiber component comprises a glass fiber.

5. The manufacturing method of the reinforcing structure according to claim 1, wherein the preparing a cured stringer comprises:
    preparing a cured carbon fiber reinforced plastic material; and
    processing a part of the cured carbon fiber reinforced plastic material to form the stringer.

6. The manufacturing method of the reinforcing structure according to claim 1, wherein the skin comprises a carbon fiber reinforced plastic material.

7. The manufacturing method of the reinforcing structure according to claim 1, wherein a resin component contained in the stringer is selected to be same as the resin component contained in the insulation protection material and a resin component contained in the adhesive material.

* * * * *